United States Patent [19]  [11]  4,330,463
Luijerink  [45]  May 18, 1982

[54] PROCESS OF PREPARING BLOOD CELL PROTEIN FROM HEMOGLOBIN

[75] Inventor: Jan H. Luijerink, Berghem, Netherlands

[73] Assignee: Internationale Octrooi Maatschappij "Octropa" B.V., Rotterdam, Netherlands

[21] Appl. No.: 203,429

[22] Filed: Nov. 3, 1980

Related U.S. Application Data

[63] Continuation-in-part of Ser. No. 104,582, Dec. 17, 1979, abandoned.

[51] Int. Cl.³ .............................................. A23J 1/06
[52] U.S. Cl. ................................ 260/112 B; 426/647; 426/657
[58] Field of Search ....................... 426/647, 657, 480; 260/112 B, 112 R

[56] References Cited

U.S. PATENT DOCUMENTS 688,604 12/1901 Dietrich et al. ............... 426/647 X
778,783 12/1904 Hofmeier ........................ 426/647
884,026 4/1908 Langer ........................... 426/647
4,098,780 7/1978 Lindrous ...................... 426/647 X

FOREIGN PATENT DOCUMENTS 616436 3/1961 Canada ........................... 426/647
432895 8/1935 United Kingdom ............. 426/657
405523 4/1974 U.S.S.R. ......................... 426/647

Primary Examiner—Robert A. Yoncoskie
Attorney, Agent, or Firm—Barry Kramer

[57] ABSTRACT

Tasteless and odourless blood cell protein isolate and heme are prepared from hemoglobin by converting the hemoglobin into a solid form by dehydration and extracting the heme from the solid product by solvent extraction with an organic solvent, preferably methanol or a methanol/ethanol mixture or a methanol/ethanol/water mixture, in the presence of acid, preferably hydrochloric acid, and recovering the blood cell protein isolate from the extraction residue. The acid may also be added to the hemoglobin before its conversion into the solid form.

8 Claims, No Drawings

PROCESS OF PREPARING BLOOD CELL PROTEIN FROM HEMOGLOBIN

This application is a continuation-in-part application of Ser. No. 104,582 filed Dec. 17, 1979, now abandoned.

This invention relates to a process of preparing bland blood cell protein isolate from hemoglobin, as well as to the blood cell protein isolate thus obtained.

It is known from J. Food Science 40, 155–159 (1975) to separate whole animal blood, preferably at low temperatures, into plasma and red blood cell concentrate, e.g. by centrifugal separation. The red blood cell concentrate is then subjected to hemolysis by dilution with water (1:1), in consequence of which the cell walls are ruptured and the cell contents are set free. The stroma (cell walls etc.) is separated from the hemoglobin solution, which is treated with acidified acetone in order to split the hemoglobin into the iron-rich heme part and the globin part. The heme is then isolated by extraction with acetone and the resulting hemeacetone is distilled to separate the acetone from the heme. The extraction residue is formed by the globin which is resolubilized and dried by spray-drying.

In this known process large amounts of solvent are necessary, however, to separate the heme from the globin, whereas the separation of the solvent both from the heme and the globin is a cumbersome procedure. Moreover it is difficult to remove off-flavours developed during the process.

It has now been found that the process of preparing blood cell protein isolate from hemoglobin or whole blood can be carried out more economically and in an easier way by converting the hemoglobin into a solid form and then extracting the heme from this solid product with an organic solvent in the presence of acid, which leaves the blood cell protein isolate as the extraction residue.

Accordingly, the present invention provides a process of preparing bland blood cell protein isolate from hemoglobin, which comprises converting the hemoglobin into a solid form by dehydration, extracting the heme from this solid product by solvent extraction in the presence of acid with an organic solvent selected from the group consisting of: (a) methanol, (b) a mixture of methanol and ethanol, and (c) a mixture of methanol, ethanol and water, and recovering the blood cell protein isolate from the extraction residue.

At least part of the acid during the extraction may be present in the organic solvent or in the solid hemoglobin.

In another embodiment, the present invention therefore provides a process of preparing bland blood cell protein isolate from hemoglobin, in which the hemoglobin is converted into an acid, solid form by dehydration, after which the heme is extracted from this acid, solid product by solvent extraction with an organic solvent, the heme is recovered from the extract, and the blood cell protein isolate is recovered from the extraction residue.

It has been found that by first converting the hemoglobin into a solid form by dehydration, the subsequent extraction of the heme by an organic solvent in the presence of acid is much easier, while the products, dependent on the solvent used, can more easily be made solvent-free. Also less solvent is needed for the extraction of the heme than in the conventional process discussed herebefore. Moreover, the process also allows deletion of the separation of the stroma and the hemoglobin solution after the hemolysis of the red blood cell concentrate.

If the hemoglobin is first converted into an acid, solid form by dehydration, the acidification of the hemoglobin solution leads to a considerable increase in viscosity of the solution, which makes it rather difficult to handle. If the subsequent dehydration step is, for instance, a spray-drying step, the acidified solution will first have to be diluted, which makes the economy of this dehydration step less attractive. If other dehydration methods are used, however, the increased viscosity of the solution plays a less important role, and in such cases the method in which the acid is present in the solid hemoglobin may advantageously be used.

The process according to the present invention uses blood cells as a starting material. These blood cells may be obtained from whole animal blood, to which previously sodium citrate may have been added to prevent curdling of the blood, which blood is separated into plasma and red cell or erythrocytes concentrate e.g. by centrifugation. Hemolyzed blood cells are then obtained by subjecting the red cell concentrate to hemolysis.

In the method where the acid during the extraction is present in the organic solvent, the hemolyzed blood cells obtained are then converted into a solid form by dehydration, such as drying, e.g. air-drying, freeze-drying, spray-drying, and the like.

If desired or necessary, the solid product may further be comminuted in a conventional way. For the subsequent extraction with the acidified organic solvent, the particle size can be adjusted to such a size range that the extraction efficiency is as high as possible. If the particle size is too great, the surface area exposed to extraction is too small, but if the particle size is too small, the resultant slurry of solids and solvent may be difficult to handle and may cause filters to be clogged.

The solvent extraction of the heme from the acid, solid product comprising heme and the blood cell protein may be carried out with any suitable organic solvent, such as ketones, e.g. acetone or methyl-ethyl ketone and alcohols, provided that the solvent does not denature the protein and has a sufficiently high solubility for the heme.

The use of methanol, or a mixture of methanol and ethanol, or a mixture of methanol, ethanol and water is preferred.

The extraction may also be carried out at reduced pressure. The temperature at which the extraction is performed varies from room temperature up to about 60° C.

The organic solvent used in the solvent extraction is first acidified with a strong acid to a pH value below 3.5, preferably with an inorganic acid, such as hydrochloric acid, sulphuric acid, and the like. The pH value is slightly dependent upon the temperature and the type of solvent used.

In the method where the acid is present in the solid hemoglobin during the extraction, the hemolyzed blood cells obtained are first acidified with a strong acid to a pH below 3.5, preferably an inorganic acid, such as hydrochloric acid, sulphuric acid, and the like. The pH value is slightly dependent upon the temperature and the type of solvent to be used in the subsequent extraction of the heme. The acidified solution in which the hemoglobin almost completely is split into the heme part and the globin part is then converted into an acid, solid form by dehydration, such as drying, e.g. air-drying, freeze-drying, spray-drying, and the like.

If desired or necessary, the acid, solid product may further be comminuted in a conventional way. For the subsequent extraction with an organic solvent, the particle size can be adjusted to such a size range that the extraction efficiency is as high as possible.

In another embodiment of this method the hemolysis and the splitting of the hemoglobin in the red blood cell concentrate is carried out in one step, by adding the red blood cell concentrate to a strong acid, preferably hydrochloric acid, with vigorous stirring, and the resultant acid solution of the heme and the blood cell protein is converted into an acid, solid form by dehydration, if desired further comminuted and subsequently subjected to solvent extraction.

In a further embodiment of this method the red blood cell concentrate may be spray-dried in the presence of a strong acid, e.g. gaseous hydrochloric acid, in which case the acid, solid product is obtained in the form of a fine powder.

What has been said about the extraction with the acid present in the solvent, equally applies to the situation in which the acid is present in the solid hemoglobin, or in which the acid is present both in the solid hemoglobin and the organic solvent.

The separation of the heme (which is at least partially crystallized and/or condensed and/or polymerized in the course of the process) may conveniently be carried out electromagnetically. The advantage of this electromagnetic separation is that far less solvent is needed for the extraction.

The blood cell protein isolate, obtained as extraction residue, may be used, after drying, in a food ingredient, as an emulsifier, a foaming agent, a protein extender, and the like, whereas the heme may be used as an iron-enriching agent in foodstuffs, animal feed or pharmaceutical products. The blood cell protein isolate is bland, i.e. tasteless and odourless.

The present invention also comprises a process of preparing an iron-enriching agent in which heme obtained with the process according to the present invention is converted into an ingestible form.

The present invention also relates to a process of preparing a protein-comprising animal or human foodstuff in which a blood cell protein isolate obtained with the process according to the present invention is incorporated into an animal or human foodstuff, optionally after having been converted into an ingestible form.

The invention will now be illustrated by the following non-restrictive Examples.

EXAMPLE I

To 100 kg of blood sediment obtained from whole blood by centrifugation as a broth of red blood cells with some occluded blood plasma, 0.1 m³ of water was added with vigorous stirring with a highspeed turbomixer (Ultra-turrax; Trade Mark). Hereafter 100 kg of 0.6 N hydrochloric acid were added, and the mixture thus obtained was again subjected to vigorous stirring with the same high speed turbomixer.

The mixture obtained was passed into a spray-drier (entrance temperature of the air: 200° C.; exit temperature of the air: 75° C.) upon which 40 kg of acid, solid product having an iron content of 3,000 parts per million was obtained.

The solid, acid product was extracted four times at 50° C. with a mixture of 90 wt.% ethanol, 6 wt.% methanol and 4 wt.% water, in which extraction procedure in the first extraction 0.8 m³, in the second extraction 0.3 m³ and the third and fourth extractions 0.2 m³ of the solvent were used.

There were obtained, as a residue after extraction, 37.6 kg of cream-coloured blood cell protein powder with an iron content of 200 parts per million.

EXAMPLE II

Red blood cell concentrate (obtained as described in Example I) was dried on a drum drier (4 rpm; steam pressure 5.88 bar absolute). The dried concentrate obtained was ground in a pin-disc mill (specific volume of product obtained 4 to 4.5 dm³/kg).

In a 25 liter stainless steel tank provided with heating and stirring means, 20 l of methanol were acidified with 187 g of 37% hydrochloric acid and heated to 35° C. To the acidified methanol 1 kg of the ground red blood cell concentrate was added with stirring. Stirring was continued for 15 minutes at 35° C. and subsequently the mixture of heme containing methanol and blood cell protein powder was centrifuged in a basket centrifuge. A cake of blood cell protein (A) was obtained.

In the same tank 20 l of methanol and 18.7 g of 37% hydrochloric acid were heated and the cake of blood cell protein (A) obtained upon the centrifugation was dispersed with stirring. Stirring of the mixture was continued for 30 minutes while it was kept at 35° C.

After this the dispersion was again centrifuged in a basket centrifuge, upon which a cake of blood cell protein (B) was obtained.

Finally the same tank was filled with 9 l of methanol and the wet cake of blood cell protein (B) was dispersed therein with stirring. Subsequently 162.5 ml of 4 N sodium hydroxide dissolved in 1 liter of methanol were added with stirring. After this addition, the final dispersion was centrifuged and the blood cell protein in the form of moist crumbs was treated for 18 hours with humid, warm air. The dry, brownish red odourless powder of blood cell protein obtained contained 15 ppm of methanol and 200 ppm of iron.

The heme was obtained as a solution in methanol in the various extraction stages.

What is claimed is:

1. A process of preparing bland blood cell protein isolate from hemoglobin, which comprise converting the hemoglobin into a solid form by dehydration, extracting the heme from this solid by solvent extraction with an organic solvent selected from the group consisting of (a) methanol, (b) a mixture of methanol and ethanol, and (c) a mixture of methanol, ethanol and water, said extraction being effected in the presence of sufficient acid to effect a pH below 3.5, and recovering the blood cell protein isolate as the extraction residue.

2. A process according to claim 1, in which at least part of the acid is present in the organic solvent.

3. A process according to claim 1, in which at least part of the acid is present in the solid hemoglobin.

4. A process according to claim 1, in which the acid is added to the hemoglobin solution before conversion of the hemoglobin into solid form by dehydration.

5. A process according to claims 1,2,3 or 4, in which the acid is hydrochloric acid.

6. A process of preparing bland blood cell protein isolate from red blood cell concentrate, which comprises combining the red blood cell concentrate with a strong acid to pH value below 3.5 with vigorous stirring, converting the acidified solution into solid form by dehydration, separating the heme from this solid product by solvent extraction with an organic solvent selected from the group consisting of (a) methanol, (b) a mixture of methanol and ethanol, and (c) a mixture of methanol, ethanol and water, and recovering the bland blood cell protein isolate as the extraction residue.

7. A process according to claim 6, in which the strong acid is hydrochloric acid.

8. A process of preparing bland blood cell protein isolate from red blood cell concentrate, which comprises spray-drying the red blood cell concentrate in the presence of sufficient gaseous hydrochloric acid to effect a pH below 3.5, extracting the heme from the solid, acid red blood cell concentrate thus obtained with an organic solvent selected from the group consisting of (a) methanol, (b) a mixture of methanol and ethanol, and (c) a mixture of methanol, ethanol and water, and recovering the bland blood cell protein isolate as the extraction residue.

* * * * *

UNITED STATES PATENT AND TRADEMARK OFFICE
CERTIFICATE OF CORRECTION

PATENT NO. : 4,330,463
DATED : May 18, 1982
INVENTOR(S) : JAN H. LUIJERINK

It is certified that error appears in the above—identified patent and that said Letters Patent is hereby corrected as shown below:

On the Title page, after paragraph [63] and before paragraph [51], insert:

--[30] Foreign Application Priority Data
Dec. 22, 1978 [GB] United Kingdom...........49772/78--.

Signed and Sealed this

Tenth Day of August 1982

[SEAL]

Attest:

GERALD J. MOSSINGHOFF

Attesting Officer   Commissioner of Patents and Trademarks